US011971160B2

(12) United States Patent
Martin et al.

(10) Patent No.: US 11,971,160 B2
(45) Date of Patent: Apr. 30, 2024

(54) VAPOR CHAMBER COOLED HIGH LUMEN DEVICE WITH IMPROVED COOLING SOLUTION

(71) Applicant: SIGNIFY HOLDING B.V., Eindhoven (NL)

(72) Inventors: Genevieve Therese Martin, Udenholt (NL); Jiang Hong Yu, Best (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/923,938

(22) PCT Filed: Apr. 29, 2021

(86) PCT No.: PCT/EP2021/061357
§ 371 (c)(1),
(2) Date: Nov. 8, 2022

(87) PCT Pub. No.: WO2021/228576
PCT Pub. Date: Nov. 18, 2021

(65) Prior Publication Data
US 2023/0175681 A1 Jun. 8, 2023

(30) Foreign Application Priority Data
May 15, 2020 (EP) .................................... 20174924

(51) Int. Cl.
*F21V 29/51* (2015.01)
*F21V 29/508* (2015.01)
(Continued)

(52) U.S. Cl.
CPC ............ *F21V 29/51* (2015.01); *F21V 29/508* (2015.01); *F21V 29/713* (2015.01); *F21V 29/74* (2015.01)

(58) Field of Classification Search
CPC ........ F21V 29/51; F21V 29/71; F21V 29/713; F21V 29/00–90
See application file for complete search history.

(56) References Cited

U.S. PATENT DOCUMENTS

2005/0173098 A1 8/2005 Connors
2008/0144319 A1* 6/2008 Chang ................. H05K 1/0206 362/294

(Continued)

FOREIGN PATENT DOCUMENTS

CN 206469225 U 9/2017
EP 0359960 A2 3/1990

(Continued)

*Primary Examiner* — Sean P Gramling

(57) ABSTRACT

The invention provides a vapor chamber element (1000) comprising a first part (1100), a second part (1200), and a third part (1300), wherein the second part (1200) and third part (1300) are associated to the first part (1100), wherein the second part (1200) and third part (1300) are configured spatially separated with a first distance (d1) along a first length (L1), defining an opening (200) between the second part (1200) and the third part (1300); wherein the vapor chamber element (1000) comprises one or more vapor chambers (100) at least partially comprised by the second part (1200) and third part (1300); wherein the vapor chamber element (1000) further comprises one or more heat fin elements (2000), wherein the one or more heat fin elements (2000) comprise one or more heat fins (2100), wherein the one or more heat fin elements (2000) bridge the first distance (d1) and close a part of the opening (200).

13 Claims, 10 Drawing Sheets

(51) Int. Cl.
*F21V 29/71* (2015.01)
*F21V 29/74* (2015.01)

(56) References Cited

U.S. PATENT DOCUMENTS

| | | | |
|---|---|---|---|
| 2009/0021944 | A1 | 1/2009 | Lee et al. |
| 2010/0225217 | A1 | 9/2010 | Liu |
| 2012/0113641 | A1 | 5/2012 | Scott et al. |
| 2012/0186798 | A1 | 7/2012 | Meyer, IV et al. |
| 2013/0223064 | A1 | 8/2013 | Lee et al. |

FOREIGN PATENT DOCUMENTS

| | | | |
|---|---|---|---|
| EP | 2437023 | A2 | 4/2012 |
| EP | 3460375 | A1 | 3/2019 |
| EP | 3569960 | A2 | 11/2019 |

* cited by examiner

VAPOR CHAMBER COOLED HIGH LUMEN DEVICE WITH IMPROVED COOLING SOLUTION

CROSS-REFERENCE TO PRIOR APPLICATIONS

This application is the U.S. National Phase application under 35 U.S.C. § 371 of International Application No. PCT/EP2021/061357, filed on Apr. 29, 2021, which claims the benefit of European Patent Application No. 20174924.9, filed on May 15, 2020. These applications are hereby incorporated by reference herein.

FIELD OF THE INVENTION

The invention relates to a vapor chamber element. The invention further relates to a vapor chamber assembly. The invention also relates to a light generating device, especially a solid state-based light generating device. Yet further, the invention also relates to luminaire, such as for street lighting, high bay lighting, floor lighting, stadium lighting, etc., comprising such lighting device (or such module).

BACKGROUND OF THE INVENTION

LED lamps with heat dissipating apparatus for supporting and cooling an LED module are known in the art. US2009/0021944, for instance, describes an LED lamp comprising: a bulb; an LED module comprising a plurality of LEDs received in the bulb; a heat dissipation apparatus supporting and cooling the LED module, the heat dissipation device comprising: a heat sink having a hollow base and a plurality of fins mounted on the base; a hollow first heat conductor supported by the heat sink; and a heat transfer device having a container defining a vacuum space receiving a phase-changeable working fluid therein, being retained in the heat sink and the first heat conductor in such a manner that an outer periphery surface of the heat transfer device is tightly enclosed by the base and the first heat conductor; wherein the LEDs are distributed on the first heat conductor.

SUMMARY OF THE INVENTION

For lighting, such as for street lighting, often HID-based lamps are used. HID-based lamps (or "HID lamps") are high intensity discharge lamps. For instance, for street lighting high pressure sodium vapor lamps may be applied. Such lamps may comprise in embodiments a polycrystalline translucent aluminum oxide discharge tube enclosed in in general an ovoid or tubular outer glass envelope. The avoid shell of the HID lamps may be internally coated with aluminum oxide powder. The discharge tube may in general contain an amalgam of mercury and sodium along with a noble gas such as neon and or xenon. HID lamps are known in the art.

HID based lamps may be replaced by LED based lamps or other solid state light source based lamps. The LEDs may need ballast and cooling elements, which may make the lighting device with the LED(s) relatively heavy. As in street lighting applications the module with the lighting device may be subject to vibrations (traffic based air movements, wind, etc.), the lighting device may vibrate out of a socket, which is of course undesirable. The more power desired, the heavier the lighting device gets, and the larger the risk of vibration related undesired artefacts.

Hence, it is an aspect of the invention to provide an alternative lighting device (or module comprising such lighting device, or (street) lamp comprising such lighting device or module), which preferably further at least partly obviates one or more of above-described drawbacks. The present invention may have as object to overcome or ameliorate at least one of the disadvantages of the prior art, or to provide a useful alternative.

In a first aspect, the invention provides a vapor chamber element (or "vapor chamber unit"). The vapor chamber element comprising a first part, a second part, and a third part. Especially, in embodiments the second part and third part are associated to the first part. In embodiments, the second part and third part are configured spatially separated with a first distance (d1) along a first length (L1), defining an opening between the second part and the third part (and in embodiments also the first part). The vapor chamber element comprises one or more vapor chambers. Especially, the one or more vapor chambers at least partially comprised by the second part and third part. In specific embodiments, the vapor chamber element may further comprise one or more heat fin elements. The one or more heat fin elements may comprise one or more heat fins. In specific embodiments, the one or more heat fin elements bridge the first distance (d1) and may close a part of the opening. Hence, especially in embodiments the invention provides a vapor chamber element comprising a first part, a second part, and a third part, wherein the second part and third part are associated to the first part, wherein the second part and third part are configured spatially separated with a first distance (d1) along a first length (L1), defining an opening between the second part and the third part; wherein the vapor chamber element comprises one or more vapor chambers at least partially comprised by the second part and third part; wherein the vapor chamber element further comprises one or more heat fin elements, wherein the one or more heat fin elements comprise one or more heat fins, wherein the one or more heat fin elements bridge the first distance (d1) and close a part of the opening.

With such vapor chamber, it may be possible to effectively cool, without the necessity of active cooling (though this is not excluded). When using a vapor chamber, the (lighting) device comprising such vapor chamber may be relatively light-weight while nevertheless heat can be transported away from the light source(s) to an optional heat sink. The use of the vapor chamber also allows using a hollow support for the light source(s). Hence, a hollow support may be provided by the (shaped) vapor chamber. This also allows a relatively light-weight support for the one or more light sources while nevertheless heat can be transported away from the light source(s) to the (optional) heat sink. Further, this also allows positioning light sources at different positions on the (light-weight) support for creating the desired beam shape and/or for creating an essentially omni-directional light source. Hence, in this way a (retrofit) HID-type LED lighting device may be provided.

As indicated above, the vapor chamber element comprising a first part, a second part, and a third part. Especially, the first part may be a basic part or support part, from which the second part and the third part extend. Further, especially the first part may be used as support part for an electronic component, such as LEDs (see also below). Hence, heat from the electronic component can be dissipated via the second part and third part as the second part and third part are associated to the first part. The three parts may be welded or brazed to each other or may form a monolithic body. Hence, in embodiments the first part, the second part, and third part are a monolithic body. Especially, the first part, the second part, and the third part may share a single vapor chamber. For instance, in embodiments the vapor chamber element may comprise two shaped plates, that are joined together via edge plates (which may be welded or brazed (or plated) to the two shaped plates) or which are joined by welding or brazing, thereby forming an extend vapor chamber with a kind of forked structure. Hence, in embodiments the vapor chamber(s) may be defined by these two plates, and optional edge plates. As will be further elucidated below, the vapor chamber(s) may be defined by metal elements, such as these plates, which may comprise one or more of titanium, copper, stainless steel, aluminum, etc.

Especially, the second part and third part are configured spatially separated with a first distance (d1) along a first length (L1). Hence, between the second part and the third part there is an opening. This opening is especially over the entire height of the second part and the third part (and the first part). Therefore, the opening is a through opening. Therefore, the opening is at least defined by the second part and the third part.

In embodiments, at one side the second part and the third part are associated to the first part. Hence, the opening may be partly defined by the first part. At another side, the opening may be open, like in the case of a forked structure. However, optionally at the other end the second part and the third part may merge to each other or be connected via a bridging element. The bridging element may in specific embodiments also comprise part of the one or more vapor chambers. Hence, the second part and third part are configured spatially separated with a first distance (d1) along a first length (L1), defining an opening between the second part and the third part (and optionally the first part). The bridging element is herein also indicated as “fourth part”.

Especially, the plates defining the chamber may be configured symmetrical relative to an element plane. Further, the second part and the third part may be configured symmetrical relative to a plane perpendicular to the element plane. Yet further, the intersection of these two planes may define an axis of elongation of the element.

As indicated above, the vapor chamber element comprises one or more vapor chambers at least partially comprised by the second part and third part. More especially, the vapor chamber element comprises one or more vapor chambers at least partially comprised by the first part, the second part, and third part.

In specific embodiments, the second part and third part mutually share a single vapor chamber. This may improve heat exchange to the surroundings and/or e.g. a heatsink. More especially, the first part, the second part, and third part mutually share a single vapor chamber. This may yet further improve heat exchange to the surroundings and/or e.g. a heatsink. In an efficient way, heat generated at the first part, e.g. by an electronic device (see below) may efficiently guide away and dissipate via the second part and/or third part.

As indicated above, in specific embodiments the vapor chamber element may also comprise a fourth part, bridging the second part and the third part, in general at their remote ends (remote from the first part). Especially, in such embodiments the first part, the second part, the third part and the fourth part mutually share a single vapor chamber. This may further improve heat exchange to the surroundings and/or e.g. a heatsink; and/or this may improve mechanical stability.

Hence, the vapor chamber (and thus essentially also the vapor chamber element) may have the shape of a central chamber with two branches, which may optionally be connected. When the branches are connected, the vapor chamber may have a cross-sectional shape of a hollow rectangle, wherein the hollow part may be elongated, and in embodiments may also be rectangular. Especially, the two branches are configured parallel. The length of the central part and the length of the branches may be in the order of 1:10-10:1, especially 1:10-2:5. However, other dimensions may also be possible.

Especially, the vapor chamber element further comprises one or more heat fin elements. The one or more heat fin elements comprise one or more heat fins. Especially, heat fins may be used to guide away heat to the surrounding. In embodiments, the one or more heat fin elements bridge the first distance (d1). In this way, part of the opening may be closed. Especially, however, the opening is not fully closed. It appears that the opening substantially improves heat dissipation, such as via convection.

Hence, in embodiments the one or more heat fin elements close 5-70%, such as especially 5-60%, such as 5-50%, of the opening. More especially, embodiments the one or more heat fin elements close 10-30%, of the opening. The vapor chamber element is especially a relatively thin element, with dimensions perpendicular to the height which are substantially larger than the height. Hence, the vapor chamber element may comprise a element plane, perpendicular to the height. The opening has an opening area which is determined parallel to this element plane. The heat fin elements may close this opening in the range of 5-60%, as indicated above. This may be determined by e.g. the projection of these heat fin elements on the opening area (see further also below).

In embodiments the vapor chamber essentially has a constant height. Hence, especially all parts may essentially have the same height.

It appears useful when the opening is relatively wide, compared to the width of the second part and the third part. This may especially facilitate convection. However, it also appears useful when the second part and the third part are not very narrow. This would reduce the transport of heat via the vapor chamber(s). The second part has a second width (d2) and the third part has a third width (d3). Especially, the second part, the opening, and the third part define a total width (w), wherein the second width (d2) and the third width (d3) together have a ratio to the total width (w), in embodiments selected from the range of $0.10 \leq (d2+d3)/w \leq 0.45$. Yet more especially, $0.15 \leq (d2+d3)/w \leq 0.4$. This may provide on the one hand a good heat transport through the second and/or third part, as well as it may allow convection through the opening. Further, especially the second width (d2) and the third width (d3) each independently are at least 2 mm, even more especially the second width (d2) and the third width (d3) each independently are at least 3 mm. The first part may essentially have a constant width. Further, the second part may essentially have constant second width. Alternatively or additionally, the third part may essentially have a constant width. Hence, in specific embodiments over the first length (of the opening), the widths of the second part and the third part may essentially be constant.

In embodiments, the first length (L1) may be selected from the range of 5-500 mm, such as selected from the range of about 10-300 mm. Further, the first distance (d1) may be selected from the range of at least about 2 mm, even more especially at least about 4 mm, such as at least about 5 mm. In specific embodiments, the first length (L1) and the first distance (d1) have a ratio $2 \leq L1/d1 \leq 40$, more especially $2 \leq L1/d1 \leq 20$, such as a ratio of about ratio $4 \leq L1/d1 \leq 10$.

The total length (L) of the vapor chamber element may be selected from the range of about 10-1000 mm, such as selected from the range of about 20-500 mm. Especially, in embodiments the vapor chamber element has a total length (L), wherein the first length (L1) and the total length (L) have a ratio $0.1 \leq L1/L \leq 0.90$, more especially selected from the range of about $0.2 \leq L1/L \leq 0.8$, like in embodiments $0.3 \leq L1/L \leq 0.7$.

As indicated above, the first part, the second part, and the third part may be a monolithic body. The heat fins, however, may be configured to the unit comprising the three parts. For instance, the heat fins may be welded or brazed to the second part and/or third part. Especially, the heat fins may be provided on a support. This support may be attached to the second part and/or third part (and optionally the first part). Hence, in embodiments the one or more heat fin elements may comprise a support configured to support the one or more heat fins, wherein the support bridges the first distance (d1). Hence, especially the one or more supports have lengths larger than d1, such as selected from the range of larger than the first distance and equal to or smaller than the total width (w).

The supports may thus block part of the opening. In order to reduce the part that is blocked, the supports may e.g. comprise opening. Alternatively or additionally, the heat fins may e.g. be hollow. Further, in order to facilitate flow the heat fins may also comprise openings. Hence, in embodiments the one or more supports may comprise one or more openings. Especially, these (support) openings may be in communication with the opening. For instance, the openings may have an opening axis perpendicular to a cross-sectional plane of the opening. Alternatively or additionally, the one or more of the one or more heat fins may be hollow. Yet alternatively or additionally, the one or more of the one or more heat fins may be perforated.

As will also be further elucidated below, the vapor chamber element may be used as support for one or more electronic components.

One or more vapor chamber elements may also be combined. In this way, e.g. an assembly may be provided which may be a support for a plurality of electronic components.

Hence, in yet a further aspect the invention also provides an assembly comprising a plurality of vapor chamber elements as described herein. In specific embodiments, the plurality of vapor chamber elements have polygonal configuration. Especially, in embodiments the plurality of vapor chamber elements have an n-gonal configuration, wherein n is especially at least 2, even more especially at least 3, even more especially selected from the group consisting of (2) 4, 6, 8, 10, and 12. Especially, in embodiments the plurality of vapor chamber elements have a hexagonal or octagonal configuration. Hence, the assembly may have a cross-section essentially having an n-gonal shape, such as a hexagonal or octagonal shape.

In yet a further aspect, the invention also provides a device comprising an electronic component and one or more vapor chamber elements as described herein. In specific embodiments, the electronic component is thermally coupled to at least one of the one or more vapor chamber elements. The term "electronic component" may also refer to a plurality of the same or of different electronic components. Hence, one or more electronic components may be thermally coupled to the same vapor chamber element. However, also two or more electronic components may be thermally coupled to a plurality of vapor chamber element.

Hence, especially electronic component, such as a light source(s), and the vapor chamber element, are thermally coupled. Hence, they may be in physical contact, or there may be a thermally conductive material in between, or the distance between the vapor chamber element and electronic component, such as the light source(s), is equal to or less than 100 μm, such as equal to or less than 50 μm, like equal to or less than 20 μm. Optionally, there may be a thermally conductive material between the vapor chamber element and the electronic component.

A thermally conductive element especially comprise thermally conductive material. A thermally conductive material may especially have a thermal conductivity of at least about 20 W/m/K, like at least about 30 W/m/K, such as at least about 100 W/m/K, like especially at least about 200 W/m/K. In yet further specific embodiments, a thermally conductive material may especially have a thermal conductivity of at least about 10 W/m/K. In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

An element may be considered in thermal contact with another element if it can exchange energy through the process of heat. Hence, the elements may be thermally coupled. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distanced between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). In embodiments, the two surfaces of the two elements may be kept at a distance with one or more distance holders.

In embodiments, the electronic component comprises one or more selected from the group consisting of a solid state light source and a driver for a solid state light source.

Further, especially the electronic component is thermally coupled to at least one of the one or more first parts. Even more especially, the electronic component is physically coupled to at least one of the one or more first parts. For instance, the electronic component may have a shorter distance to the first part, such as essentially zero distance, than to the second part and/or to the third part.

The device comprising a light source may also be indicated as "lighting device" or "light device" or "light generating device".

Further (specific) embodiments are described below.

As indicated above, the invention provides in embodiments a lighting device comprising a vapor chamber element, and one or more light sources, especially a plurality of light sources. This lighting device can be configured retrofit for HID lamps, and may thereby be used for replacing existing HID lamps in e.g. street lighting, indoor lighting, e.g. High Bay lighting applications. For instance, the lighting device may include a connector configured to be functionally coupled to a socket, such as an Edison screw, a bayonet mount, etc.

The term “light source” may refer to a semiconductor light-emitting device, such as a light emitting diode (LEDs), a resonant cavity light emitting diode (RCLED), a vertical cavity laser diode (VCSELs), an edge emitting laser, etc. The term “light source” may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term “light source” may in embodiments also refer to a so-called chips-on-board (COB) light source. The term “COB” especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term “light source” may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The phrases “different light sources” or “a plurality of different light sources”, and similar phrases, may in embodiments refer to a plurality of solid state light sources selected from at least two different bins. Likewise, the phrases “identical light sources” or “a plurality of same light sources”, and similar phrases, may in embodiments refer to a plurality of solid state light sources selected from the same bin.

Hence, in embodiments the plurality of light sources comprises solid state light sources.

In embodiments, the light source(s) comprise a LED strip. Such LED strip(s) may directly be attached to the first external surface.

The vapor chamber element may thus be configured as support for the one or more light sources.

The one or more light sources, especially the plurality of light sources, are configured to generate light source light. Especially, the light source(s) are configured to generate visible light. In specific embodiments, the light source(s) are configured to generate white light, though other types of visible light may also be possible. The terms “visible”, “visible light” or “visible emission” and similar terms refer to light having one or more wavelengths in the range of about 380-780 nm. The term “white light” herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. For street lighting, the CCT may e.g. be selected from the range of about 2000-6000 K, such as 3000-4500 K.

In alternative embodiments, the lighting device may be configured to generate colored radiation, e.g. for horticulture, agriculture, or fish farming, etc.

In alternative embodiments, the lighting device may be configured to generate essentially UV radiation, e.g. for disinfection purposes. In alternative embodiments, the lighting device may be configured to generate essentially IR radiation, e.g. for heating, or horticulture, etc.

The lighting device is configured to generate lighting device light, which may essentially consist of the light source light of the one or more light sources. The lighting device light may be controllable in intensity and/or directionality and/or shape. The latter two options may especially be the case(s) when there is a plurality of light sources of which two or more have optical axes that are not configured parallel. This may e.g. be achieved by arranging the light sources at different positions on a shaped vapor chamber element.

Further, especially when more than one light source is applied, the lighting device light may be controllable in one or more of color point, color temperature, color rendering index, etc. Hence, the lighting device may also comprise or may be functionally coupled to a control system. In embodiments, the control system may be a slave control system, configured to control a subset of a plurality of lighting devices (such as a control system for controlling a plurality of street lighting luminaires in a single street or a couple of streets), while a (central) master control system may be configured to control such slave system. Or, in other embodiments, there may be a single (remote) control system. Yet further embodiments may also be possible.

The term “controlling” and similar terms especially refer at least to determining the behavior or supervising the running of an element. Hence, herein “controlling” and similar terms may e.g. refer to imposing behavior to the element (determining the behavior or supervising the running of an element), etc., such as e.g. measuring, displaying, actuating, opening, shifting, changing temperature, etc. Beyond that, the term “controlling” and similar terms may additionally include monitoring. Hence, the term “controlling” and similar terms may include imposing behavior on an element and also imposing behavior on an element and monitoring the element. The controlling of the element can be done with a control system, which may also be indicated as “controller”. The control system and the element may thus at least temporarily, or permanently, functionally be coupled. The element may comprise the control system. In embodiments, the control system and element may not be physically coupled. Control can be done via wired and/or wireless control. The term “control system” may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a “mode” or “operation mode” or “mode of operation”. Likewise, in a method an action or stage, or step may be executed in a “mode” or “operation mode” or “mode of operation”. The term “mode” may also be indicated as “controlling mode”. This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

As indicated above, the device comprises a vapor chamber element. The vapor chamber element comprises a vapor chamber and optionally other elements.

Here below, some embodiments in relation to the vapor chamber (element) are described. Would the vapor chamber element comprise a plurality of vapor chambers, the below may apply to each of the vapor chambers individually. Likewise, as the assembly may comprise a plurality of vapor chambers, the below may apply to each of the vapor chambers individually.

Vapor chambers are known in the art and may be based on essentially the same principle as heat pipes (which are also known in the art). Both systems are known as "two-phase devices". Both two-phase devices may include a wick structure (sintered powder, mesh screens, and/or grooves) applied to the inside wall(s) of an enclosure (tube or planar shape). Liquid, such as water (for copper device) or acetone (e.g. for aluminum device), is added to the device and the device is vacuum sealed. The wick may distribute the liquid throughout the device. However, when heat is applied to one area of the two-phase device, the liquid turns to vapor and moves to an area of lower pressure where it cools and returns to liquid form whereupon it moves back to the heat source by virtue of capillary action. A common wick structure is a sintered wick type because it offers a high degree of versatility in terms of power handling capacity and ability to work against gravity. Mesh screen wicks may allow the heat pipe or vapor chamber to be thinner relative to a sintered wick. Also, a grooved wick may be applied. The grooves may act as an internal fin structure aiding in the evaporation and condensation. A difference between the heat pipe and the vapor chamber may be that the heat pipe may have an essentially rod-shaped shape, whereas the vapor chamber may in general include two essentially planar plates at a relative short distance (such as up to 5 mm), with optionally spacers in between. Further, for the vapor chamber the hot spot may relatively freely be chosen, whereas for a heat pipe there is a hot and cold side.

In the present invention, the vapor chamber may be essentially flat. However, in other embodiments especially the vapor chamber has a convex shape, with the light source(s) associated to the convex surface thereof. This also allows creating a lighting device with may provide light in many or essentially all directions. Hence, in embodiments the vapor chamber element may have a convex shape.

Hence, in specific embodiments the vapor chamber is defined by at least a first plate and a second plate having an average plate distance (d). At the edges of the plate, the plates may be welded together to provide a closed chamber. The plates may also define, together with one or more edges, the vapor chamber. In embodiments, over a substantial part of the first plate and a substantial part of the second plate, the plates may be configured parallel. For instance, over at least 50%, such as at least 80%, like at least 90% of an area of the first plate, and over at least 50%, such as at least 80%, like at least 90% of an area of the second plate, the plates may be configured parallel. Hence, over a substantial part of the first plate and a substantial part of the second plate, the distance between the plates may essentially not vary.

In specific embodiments, the average plate distance (d) is selected from the range of 50 μm-5 mm. In embodiments, the average plate distance may be at maximum 1 mm. The average plate distance may even be equal to or smaller than 0.4 mm, e.g. in the range of 100-400 μm, like 200-400 μm, such as at least 250 μm.

In embodiments, the first plate and a second plate each have a second thickness (d2) independently selected from the range of 50-5000 μm, such as 100-2000 μm, like especially 300-2000 μm. The phrase "independently selected" and similar phrases may refer to embodiments wherein for the relevant elements the same value of the parameter is chosen, i.e. in these embodiments both plates may have the same thickness, but may also refer to embodiments wherein for the relevant elements different values of the parameter is chosen, i.e. in these embodiments both plates may have a thickness selected from the indicated range, but they may have different thicknesses. Further, in embodiments the second thickness(es) may also vary over the first plate and/or the second plate.

The total height or thickness of the vapor chamber may e.g. be selected from the range of 0.1-20 mm, such as especially 0.2-10 mm. Even more especially, the total height may be selected from the range of 0.2-5 mm.

In general, the chamber will have a length and a width that are substantially larger than the average plate distance. Further, in general, the vapor chamber will have a cross-section which is essentially rectangular. As the vapor chamber may have a convex shape, a projection of the vapor chamber on a plane may in embodiments have an essentially rectangular shape. The vapor chamber, or the vapor chamber element, may have an axis of elongation. The axis of elongation may be an axis along which the length of the vapor chamber may be defined.

Further, in general the chamber height (or distance) may also be much smaller than the length and/or width of the vapor chamber element. Hence, in specific embodiments the vapor chamber element has a total length (L) and the average plate distance (d) have a ratio selected from the range of $L/d \geq 10$, such as ≥20, like selected from the range of 10-10,000. Alternatively or additionally, in specific embodiments the vapor chamber element width (W) and the average plate distance (d) may have a ratio selected from the range of $W/d \geq 10$, such as ≥20, like selected from the range of 10-10,000.

In embodiments, the vapor chamber length L may e.g. be selected from the range of 0.5-50 cm, such as 2-40 cm, like selected from the range of 2-20 cm, such as in the range of 4-15 cm, e.g. 5-12 cm. Likewise, this may apply to the chamber width (or circumference), though in embodiments the chamber width may be smaller than the chamber length.

The vapor chamber element comprises (i) a first external face defined by at least part of the first plate. Hence, a plate, which may be planar or which may be curved, may provide a first external face. Another plate, the second plate, may provide a second external surface. Hence, the vapor chamber element may also comprise second external face defined by at least part of the second plate. Referring to the embodiment of the cylinder, the first plate and the second plate may be both cylindrical, with the former having a larger internal diameter than the outer diameter of the latter, such that a space is defined between the cylindrical plates. At the edges of the cylinder, the plates may be welded together, or otherwise closed.

As indicated above, the first external face may in embodiments be planar.

The electronic component may especially be associated to an external face of one of the plates, especially at the first part.

The term "associated" especially indicates that the light sources and/or other electronic component are physically coupled to the first external face. In embodiments the first plate (and the second plate) may comprise a metal. In embodiments, the light sources may be associated to a flexible PCB or a rigid PCB, or a flex-rigid PCB, which is associated to the external face. In embodiments, a LED strip may be associated with the external face. Association may be via physical means, like clamping, screws, etc., or other means, like glue, adhesive, welding, etc. etc. This is known to a person skilled in the art.

Hence, the vapor chamber material and the heat fins may comprise a thermally conductive material, such as having a thermal conductivity of at least 1 W/(m·K), even more especially at least 5 W/(m·K), such as at least 10 W/(m·K), like at least 100 W/(m·K), such as even at least 1000 W/(m·K). In specific embodiments, the thermally conductive material comprises a metal, such as copper or aluminum, graphite or a ceramic material. Hence, in embodiments the thermally conductive material comprises one or more of a metal, graphite and a ceramic material. A graphite sheet may have an anisotropic thermal conductivity. In the plane of the plate(s) it can have thermal conductivity in the range 100-1000 W/Km and in the direction perpendicular to the graphite sheet material it may be in the range 2-10 W/Km. Herein, we refer to in plane thermal conductivity when we refer to graphite type of materials.

Heat fins are known in the art. In embodiments, they may have a thickness selected from the range of 50 μm-5 mm, such as 100 μm-4 mm, like 0.2-2 mm. For instance, in embodiments, the sink fins may have thicknesses of equal to or less than 0.3 mm.

Other dimensions (other than the thickness) of the heat fins may be much larger, such as especially a length or a height, which may be at least 10 times, such as in embodiments at least 20 times larger, such as selected from the range of 5-100 mm. The heat fins may be configured perpendicular to the axis of elongation, though it is not excluded that they are configured parallel to an axis of elongation. For instance, when configured in an (internal) cavity one or more of the heat fins may be configured essentially parallel to the axis of elongation. However, within a plurality of heat fins, there may also be two or more subsets with differently configured heat fins. In general, heat fins have plate-like shapes.

Heat fins may in embodiments be essentially flat plates. However, heat fins can in principle have essentially any shape, including organic shapes (if applicable).

Hence, in embodiments the first plate and the second plate may each independently be selected to be from copper, aluminum, (stainless) steel, graphite and a ceramic material. Alternatively or additionally, the first plate and/or the second plate may comprise a metal other than copper, aluminum, or stainless steel. Alternatively or additionally, the first plate and/or the second plate may comprise 3D printed material. In embodiments, the first plate and/or the second plate may comprise (3D printed) composite material. Alternatively or additionally, the first plate and/or the second plate may comprise glass or polymeric material. In embodiments, the first plate and/or the second plate may comprise two or more of the afore-mentioned materials. More especially, the first plate and a second plate comprise a material selected from the group consisting of aluminum, copper, and (stainless) steel. The term "material" may in embodiments also refer to a plurality of different materials.

In specific embodiments, the light sources may only be available on part of the vapor chamber element. This is indicated as the first part. This allows that part of the vapor chamber element receives the thermal energy, which then via the vapor chamber is transported to another (more remote from the light sources) part, wherein no light sources are available. At that other part, the vapor in the chamber may cool, and thermal energy may be dissipated. Especially, this other part may be in thermal, such as physical, contact with the heat sink. As indicated above, the heat sinks may comprise heat fins. Hence, the heat fins may be in thermal, such as physical, with the vapor chamber element at the other part thereof.

Therefore, in specific embodiments all light sources may be configured at a second distance (L2) from the second end independently selected from the range of at least 0.2*L, such as at least 0.3*L, like at least 0.4*L. Here, the phrase "independently selected" refers to the embodiments wherein all light sources have a distance selected from afore-mentioned range, though the respective distances may mutually differ.

In embodiments, one or more light sources, especially a plurality, have optical axis perpendicular to a mutual axis. In specific embodiments, one or more light sources, especially a plurality, have optical axis perpendicular to the axis of elongation. In yet further specific embodiments, two or more light sources have optical axes having mutual angles unequal to 0°. For instance, a plurality of light sources may provide optical axes wherein the two most extreme have a mutual angle selected from the range of 90-180°. In yet further embodiments, a plurality of light sources may provide optical axes distributed, especially evenly distributed, over 360° (around an axis, especially the axis of elongation). For instance, in the case of a hexagonal cross-section of the first external face, each of the six segments may comprise one or more solid state light sources, especially a plurality, attached thereto. In other embodiments, however, in the case of a hexagonal cross-section of the first external face, only three (adjacent) segments of the six segments may comprise one or more solid state light sources, especially a plurality, attached thereto.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, etc.

Especially, the lighting device may be part of or may be applied in (outdoor) road lighting systems. The term "street lighting" refers at least to (outdoor) road lighting. However, (also other) applications may be possible, such as e.g. high-way lighting, pedestrian walk lighting, wall wash applications, parking garage lighting, outdoor parking lighting, gas station lighting. Yet other applications may include automotive lighting or retail lighting. The invention may in aspects be applied to bulbs, spots, point sources, high lumen products, lighting modules, consumer lamps, professional lamps, stadium lighting, high-bay or low-bay lighting, high power electronics, oil industry lighting, gas industry lighting, harsh environment type of application, etc.

In yet a further aspect, the invention also provides a module comprising a reflector and the lighting device as defined herein, wherein the reflector is configured to redirect at least part of the light source light. In yet further specific embodiments, the reflector partly circumferentially surrounds the lighting device. Also here, the term "circumferentially" does not necessarily imply round or circular, but may also refer to a segmented shape that surrounds (partly) the lighting device. Reflectors for e.g. street lighting luminaires are known in the art.

In yet a further aspect, the invention also provides a luminaire, such as a street lighting luminaire, comprising device as defined herein. In yet further specific embodiments, the street lighting luminaire comprises a pole. In other embodiments, the luminaire may comprise a mounting system, e.g. for floodlight applications. A floodlight may be defined as a broad-beamed, high-intensity artificial light. Floodlight may be used to illuminate e.g. outdoor playing fields, stage lighting etc. In a further aspect, the invention also provides a lamp comprising the vapor chamber element. Especially, the invention provides a lamp comprising the device as described herein. Hence, in an aspect the invention provides a lamp or a luminaire comprising the device as defined herein.

In an embodiment, the one or more vapor chamber elements and/or one or more vapor chambers may be manufactured by 3D printing. One or more plates may be manufactures by 3D printing. One or more wick structures may be manufactured by using 3D printing. One or more spacers spacing the bottom and top plates and/or spacing the bottom and top wick structures may be manufactured by 3D printing. One or more heat fin elements and/or one or more heat fins may be manufactured by 3D printing.

In an embodiment, the one or more vapor chamber elements and/or one or more vapor chambers may be foldable (e.g. in a horizontal and/or vertical direction). Thus, the lighting device may comprise one or more foldable vapor chamber elements and/or one or more foldable vapor chambers.

In an embodiment, the one or more heat fin elements and/or one or more heat fins may be foldable (e.g. in a horizontal and/or vertical direction). Thus, the lighting device may comprise one or more foldable heat fin elements and/or one or more foldable heat fins.

In an embodiment, the folding of the one or more vapor chamber elements and/or one or more vapor chambers may be arranged by using at one or more (straight) folding lines which are arranged onto the one or more vapor chamber elements and/or one or more vapor chambers.

In an embodiment, the folding of the one or more heat fin elements and/or one or more heat fins may be arranged by using one or more (straight) folding lines which are arranged onto the one or more heat fin elements and/or one or more heat fins.

In embodiments, the angle of folding of the one or more vapor chambers (elements) and/or the one or more heat fins (elements) may be in a range from 45 to 135 degrees. Preferably, the folding angle is in a range from 60 to 120 degrees, more preferably the folding angle is in a range from 80 to 110 degrees, most preferably the folding angle is in a range from 85 to 105 degrees.

In embodiments, the folding line may comprise an indent (or a recess) in the one or more vapor chambers (elements) and/or the one or more heat fins (elements). The indent or recess may be a V-groove having a length Lv. 0 may be arranged over the complete width of the one or more vapor chambers (elements) and/or the one or more heat fins (elements). The V-groove is preferably arranged in the top and or bottom plate of the vapor chamber (element). The V-groove may be made with 3D printing. The minimum thickness of the V groove may be in a range from 0.1 to 0.5 mm. The thickness of the top plate, bottom plate and/or fin (elements) may be >0.7 mm. The fin spacing may be larger than 5 mm. Optionally, the folded fins may be a bendable thin vapor chamber having a thickness less than 0.5 mm. The material of the fins may be a metal sheet such as e.g. of copper or silver. The 3D printable foldable fins may also be a polymer based thermal composites such as graphite, graphene with thermal conductivity anisotropy higher than aluminum.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

FIGS. 1*a*-1*d* schematically depict several embodiments and variants of a vapor chamber element 1000.

Figure 1A:
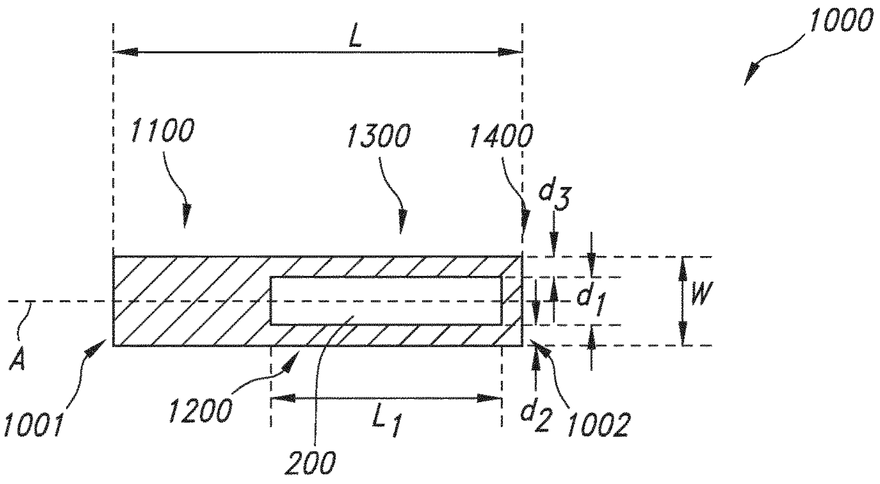
FIGS. 1*a*-1*d* schematically depict some embodiments and variants of the lighting device.

FIG. 1*a* schematically depicts a top view. Heat fin elements are not depicted for the sake of understanding (however, see further below).

The vapor chamber element 1000 comprises a first part 1100, a second part 1200, and a third part 1300. As schematically depicted, the second part 1200 and third part 1300 are associated to the first part 1100. The second part 1200 and third part 1300 are configured spatially separated with a first distance d1 along a first length L1. In this way, an opening 200 is defined between the second part 1200 and the third part 1300 (and in these embodiments also the first part 1100). The vapor chamber element 1000 comprises one or more vapor chambers 100 (see FIG. 1*b*) at least partially comprised by the second part 1200 and third part 1300.

The second part 1200 has a second width d2. The third part 1300 has a third width d3. Especially, the second part 1200, the opening 200, and the third part 1300 define a total width w. In embodiments, the second width d2 and the third width d3 together have a ratio to the total width w selected from the range of $0.1 \leq (d2+d3)/w \leq 0.45$, more especially $0.15 \leq (d2+d3)/w \leq 0.4$. In embodiments, the second width d2 and the third width d3 each independently are at least 2 mm.

For instance, the second width d2 and the third width d3 may each independently be at least 3 mm.

In specific embodiments, the first length L1 and the first distance d1 have a ratio $2 \leq L1/d1 \leq 40$. Yet further, the vapor chamber element 1000 has a total length L. Especially, the first length L1 and the total length L have a ratio $0.2 \leq L1/L \leq 0.8$.

Note that at the end of the second part 1200 and the third part 1400, a further part 1400 is depicted. This part connects the second part 1200 and the third part 1400. Also this part may comprise a vapor chamber.

Reference A indicates an axis of elongation. References 1001 and 1002 indicate a first end and a second end, respectively. These may define the length L. The axis of elongation A and the length L may especially be parallel. Further, they may be determined in the element plane 1050 (see FIG. 1*c*).

Figure 1B:
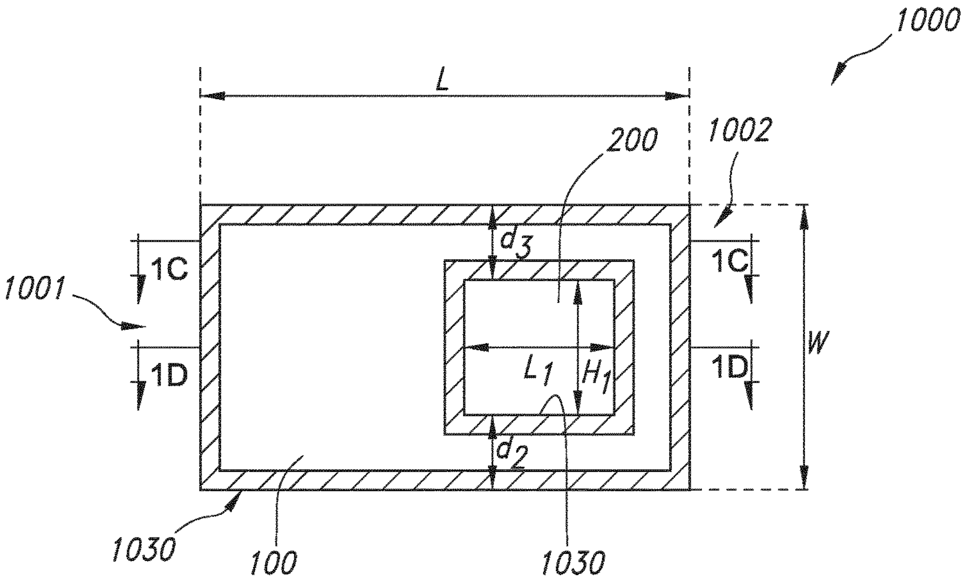
Figure 1C:
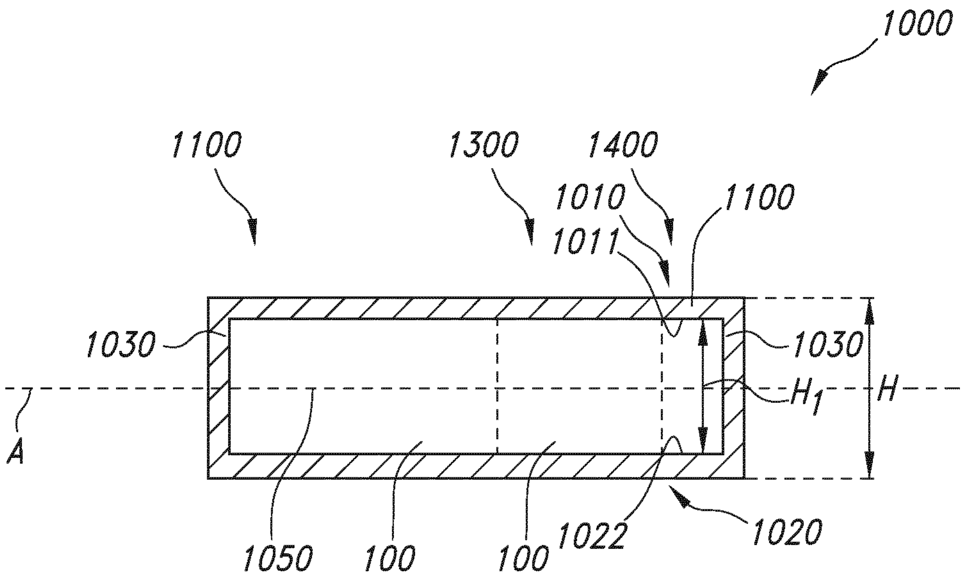

FIG. 1*b* schematically depicts a cross-sectional view parallel (or coinciding) with the element plane (see e.g. FIG. 1*c*). In the schematically depicted embodiment, the first part 1100, the second part 1200, and third part 1300 (and optionally the fourth part 1400) mutually share a single vapor chamber 100. Hence, in embodiments the first part 1100, the second part 1200, and third part 1300 are a monolithic body. Reference 1030 indicates the edge (or wall of the vapor chamber(s) 100).

FIG. 1*c* schematically depicts yet another cross-sectional view, along the lines 1*c*-1*c* indicated in FIG. 1*b*. The view is perpendicular to the element plane 1050. Here, it can also be seen that the first part 1100, the second part 1200/third part 1300, and the option fourth part 1400 may provide a single vapor chamber 100.

The vapor chamber 100 is at least defined by two plates, indicated with references 1010 and 1020. Inner faces 1011 and 1022, respectively, may defined a plate distance or vapor chamber height H1. These plates 1010 and 1020 have an average plate distance H1. In embodiments, the average plate distance H1 may be selected from the range of 50 μm-5 mm. The first plate 1010 and the second plate 1020 may each have a thickness independently selected from the range of 50-5000 μm, such as 300-2000 μm. The first plate 1010 and the second plate 1020 (and the optional edge 1030) may comprise a material selected from the group consisting of aluminum, copper, and (stainless) steel. The vapor chamber 100 may comprise wick material (not depicted). The thickness or vapor chamber height H1 may essentially be constant over the entire plates 1010, 1020.

The element length L and the average plate distance H may e.g. have a ratio selected from the range of $L/H \geq 10$. In embodiments, H may be selected from the range of 0.2-5 mm.

In specific embodiments, also $L1/H \geq 10$.

Figure 1D:
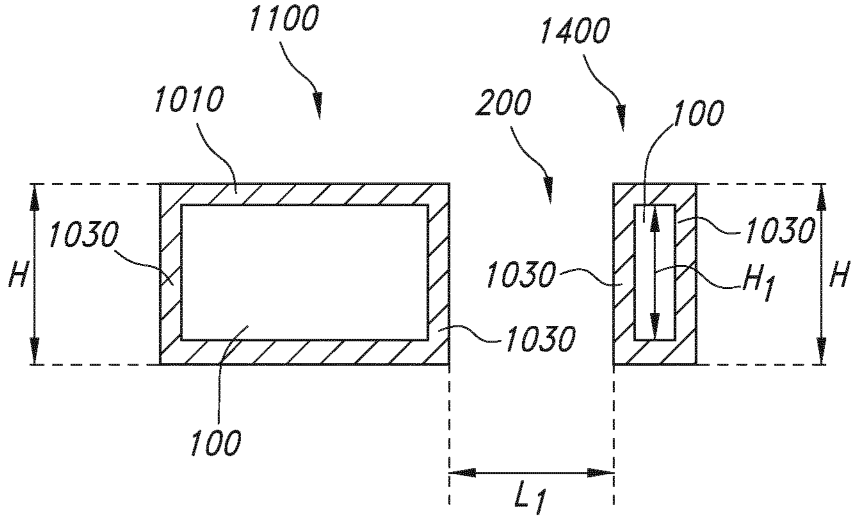

FIG. 1*d* schematically depicts yet another cross-sectional view, along the lines 1*d*-1*d* indicated in FIG. 1*b*. The different vapor chamber 100, however, form a single vapor chamber 100 (see also FIGS. 1*b*-1*c*).

FIGS. 2*a*-2*e* schematically depicts some further embodiments.

Figure 2A:
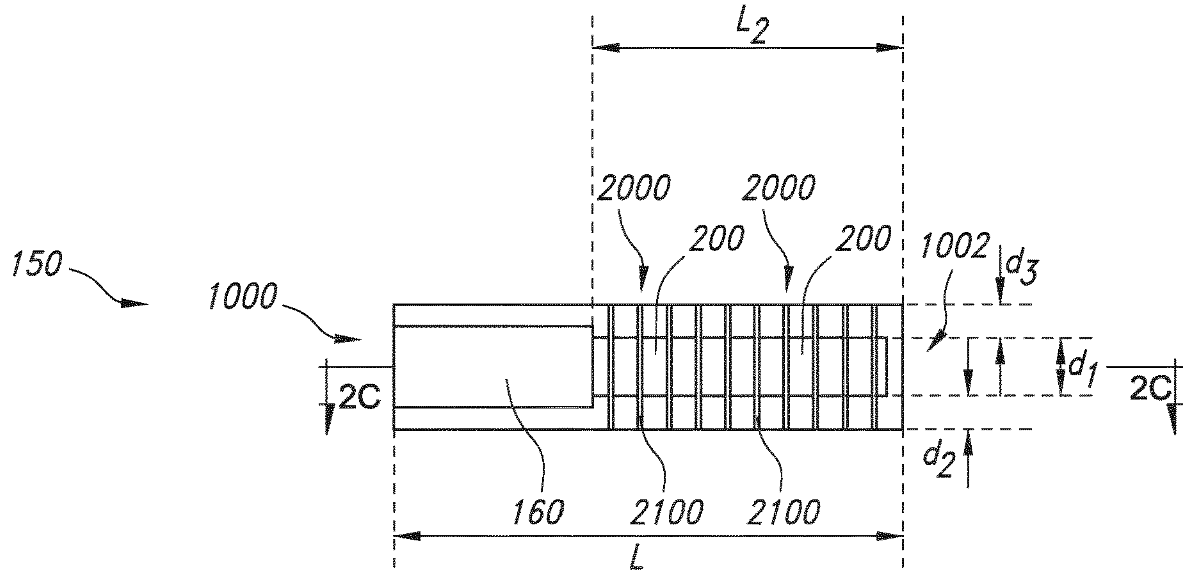
FIGS. 2*a*-2*e* schematically depict some further embodiments and variants.

As schematically depicted in FIG. 2*a*, the vapor chamber element 1000 may further comprises one or more heat fin elements 2000. The one or more heat fin elements 2000 comprise one or more heat fins 2100. As schematically depicted, the one or more heat fin elements 2000 bridge the first distance d1 and close a part of the opening 200. Especially, the one or more heat fin elements 2000 close 5-60% of the opening 200 (see also FIG. 2*e*).

FIG. 2*a* also schematically depicts an embodiment of a device 150 comprising an electronic component 160 and one or more vapor chamber elements 1000 (here a single vapor chamber element). In embodiments, the electronic component 160 is thermally coupled to at least one of the one or more vapor chamber elements 1000. FIG. 2*a* is a top view.

In specific embodiments, all light sources 10 and/or all (other) electronic components 150) may be configured at a second distance L2 from the second end independently selected from the range of at least 0.2*L, such as at least 0.3*L, like at least 0.4*L.

Figure 2B:
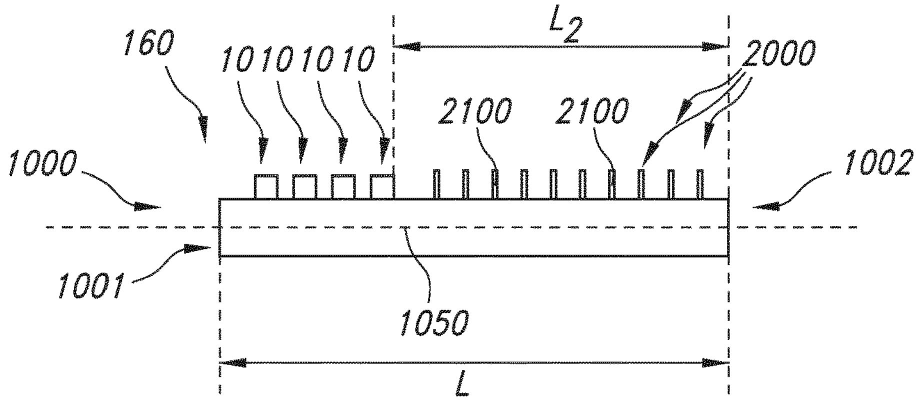

FIG. 2*b* schematically depicts a side view. Further, by way of example it is schematically depicted that the electronic component 160 comprises one or more selected from the group consisting of a solid state light source 10 and a driver 110 for the solid state light source 10 (see e.g. also FIG. 2*c*).

Further, the electronic component 160 is thermally coupled to at least one of the one or more first parts 1100. Here, the electronic component may be physically coupled to respective the first part 1100.

Figure 2C:
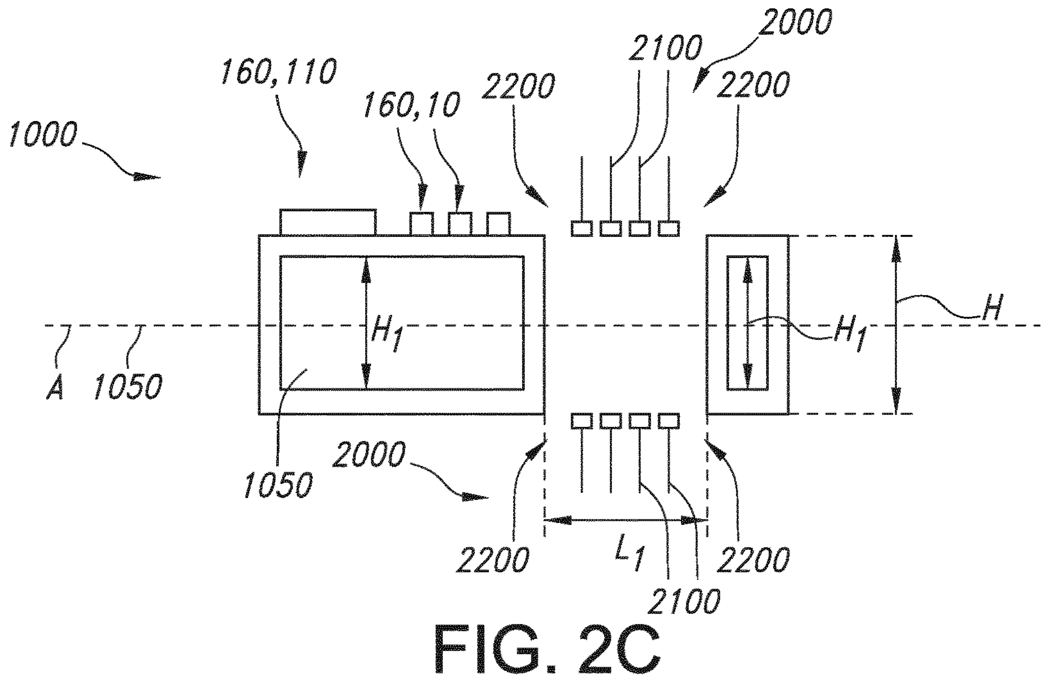

FIG. 2*c* again schematically depicts a cross-section perpendicular to the element plane 1050, based on the cross-section indicated in FIG. 2*a*. Further, by way of example the heat fin elements 2000 are arranged at both sides. Note that the heat fin elements 2000 may also be arranged at a single side. Further, the heat fin elements 2000, or more especially the heat fins 2100 may differ in shape and/or size (e.g. at one side relative to the other).

FIG. 2*c* also schematically depicts an embodiment wherein the one or more heat fin elements 2000 comprise a support 2200 configured to support the one or more heat fins 2100, wherein the support 2200 bridges the first distance d1 (see FIG. 2*c* in combination with e.g. FIG. 2*a*).

Figure 2D:
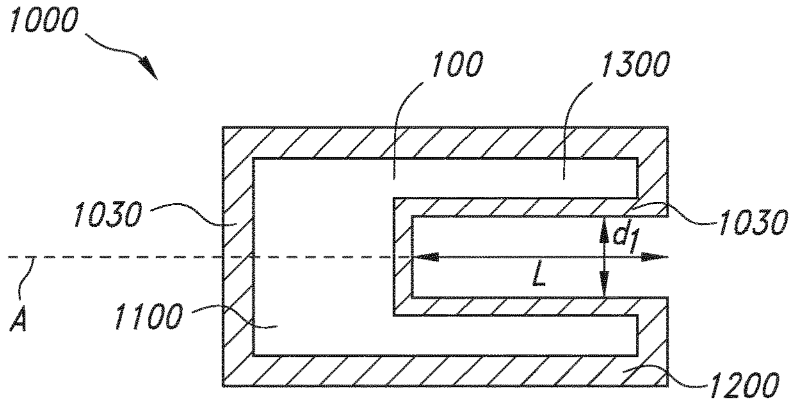

FIG. 2*d* schematically depicts an embodiment of the vapor chamber element 1000 without bridging element or fourth part 1400. For the sake of clarity, the heat fin elements 2000 are not depicted.

Figure 2E:
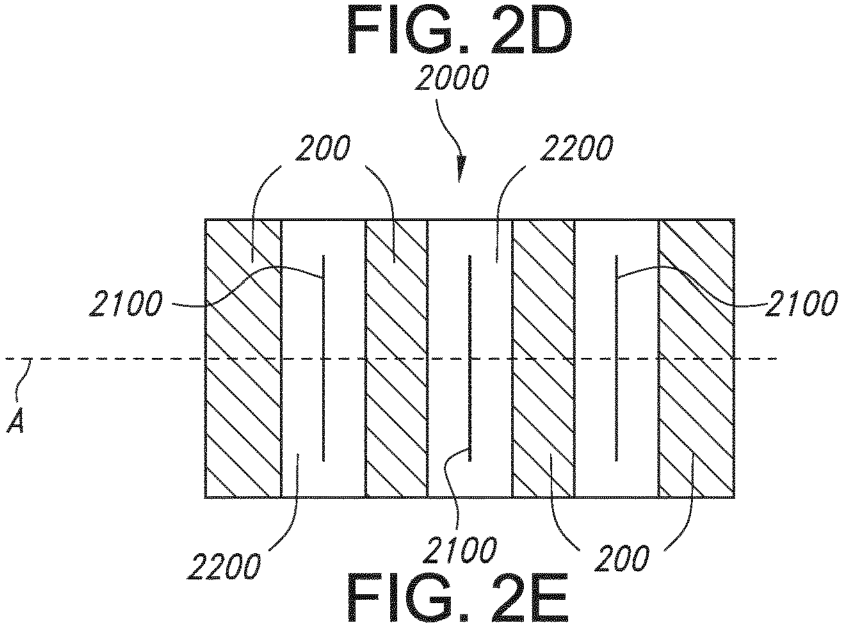

FIG. 2*e* schematically only depicts the opening 200 with heat fin elements 2000 covering part of it. The hatched area is not closing the opening. Especially, the one or more heat fin elements 2000 close 5-60% of the opening 200. Hence, the hatched area may be 40-95% of the total cross-sectional area of the opening 200. When heat fin elements 2000 are configured at both sides, they will in general be configured symmetrical. Whether or not configured symmetrical, in embodiments the respective percentage of closure/opening at both sides may essentially be the same.

FIGS. 3*a*-3*d* schematically depict possible embodiments of an assembly 50 comprising a plurality of vapor chamber elements 1000 as described herein.

Figure 3A:
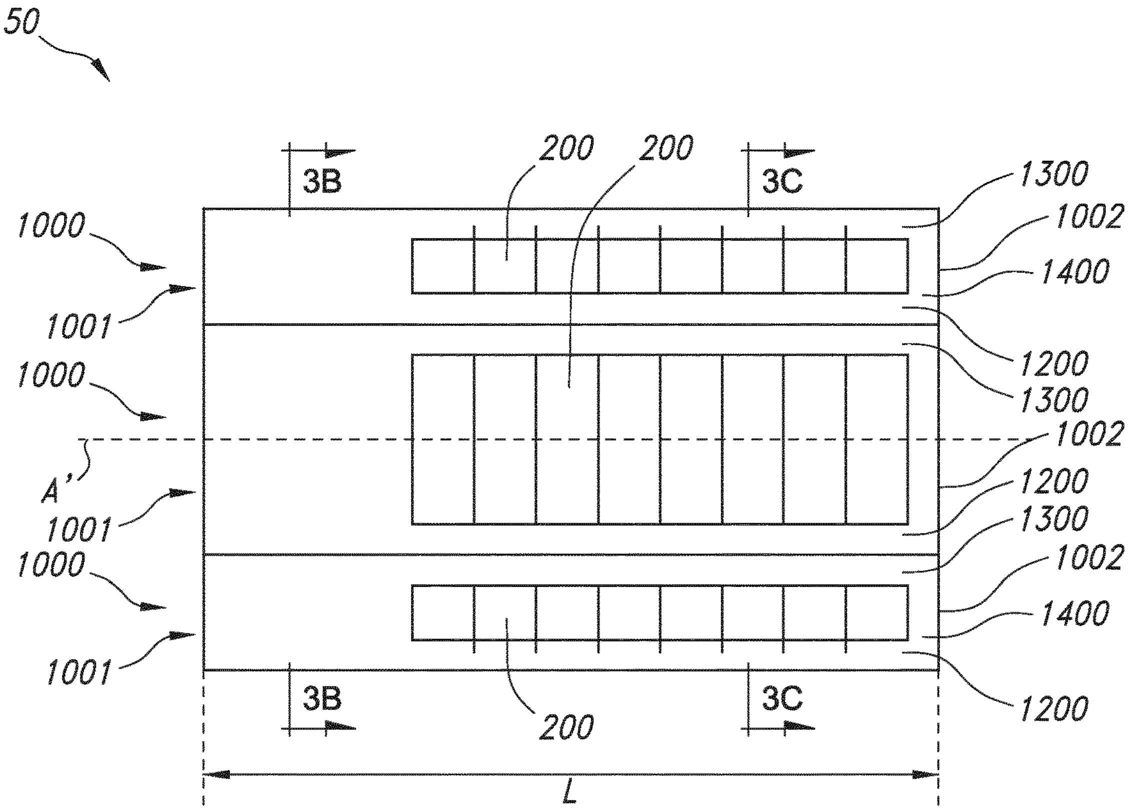
FIGS. 3*a*-3*d* schematically depict some further embodiments and variants.

FIG. 3*a* schematically depicts a side view of such assembly 50. Especially, in embodiments the plurality of vapor chamber elements 1000 have an n-gonal configuration, wherein n is selected from the group consisting of 4, 6, 8, 10, and 12. Here, an hexagonal embodiment is very schematically depicted. In this very schematically drawing, one vapor chamber element 1000 is shown in the middle, and the two others are bending behind the plane of drawing. Here, reference A' indicates an axis of elongation of the assembly 50.

Figure 3B:
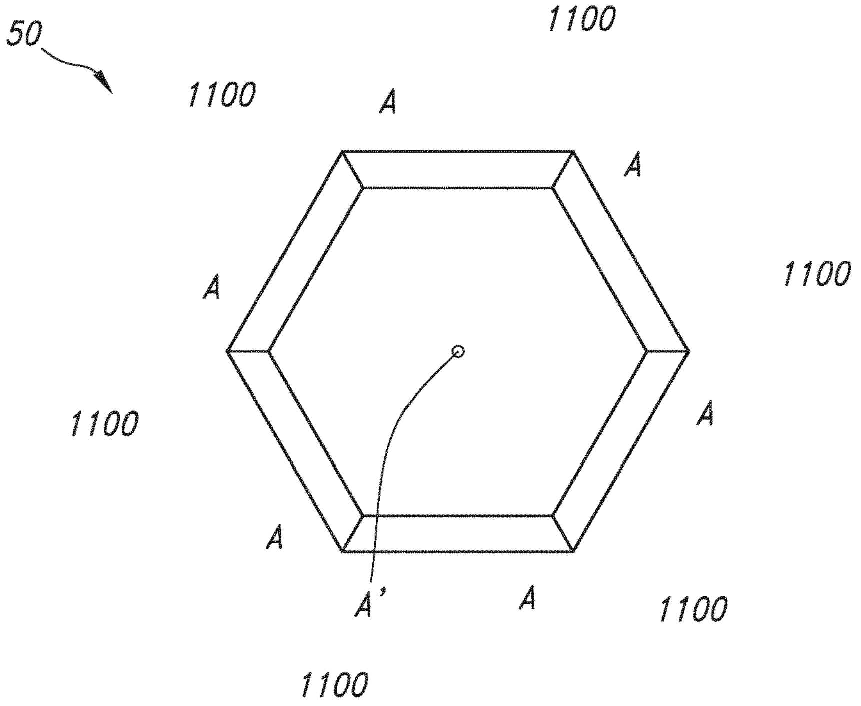

FIG. 3*b* schematically depicts a cross-sectional view at the first parts 1100 (see also the indication in FIG. 3*a*).

Figure 3C:
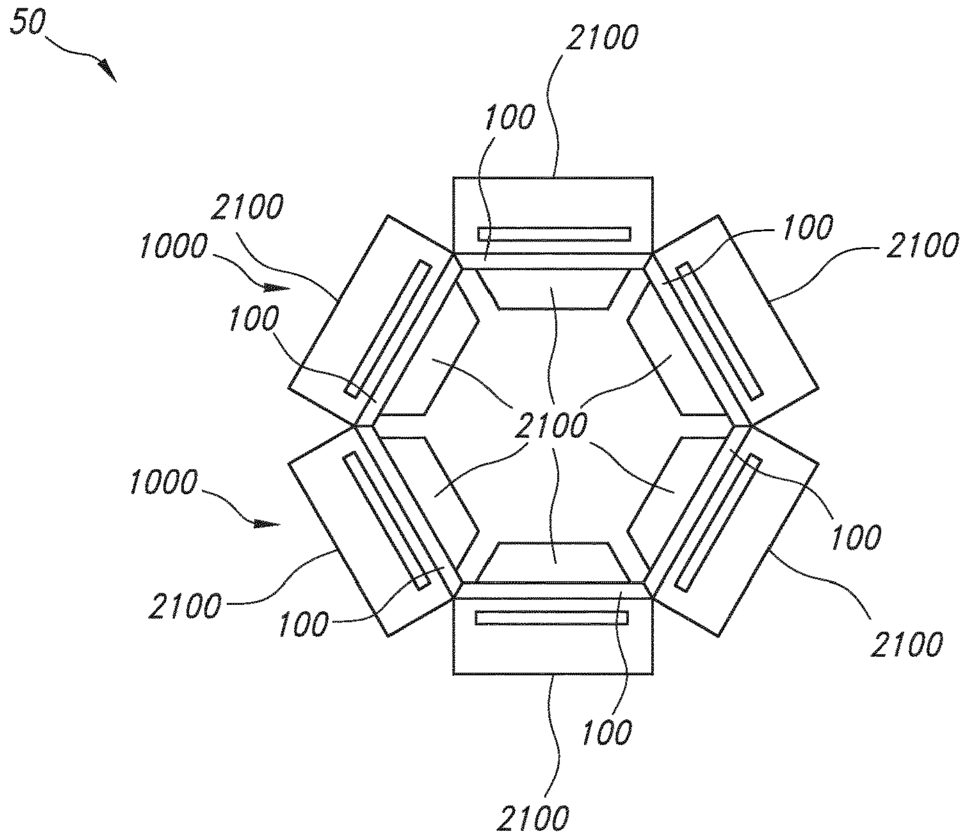

FIG. 3*c* schematically depicts a possible cross-sectional view at the first parts 1100 (see also the indication in FIG. 3*a*). Here, heat fins 2100 are available at both sides of the opening 200 (see also FIG. 3*a*).

Figure 3D:
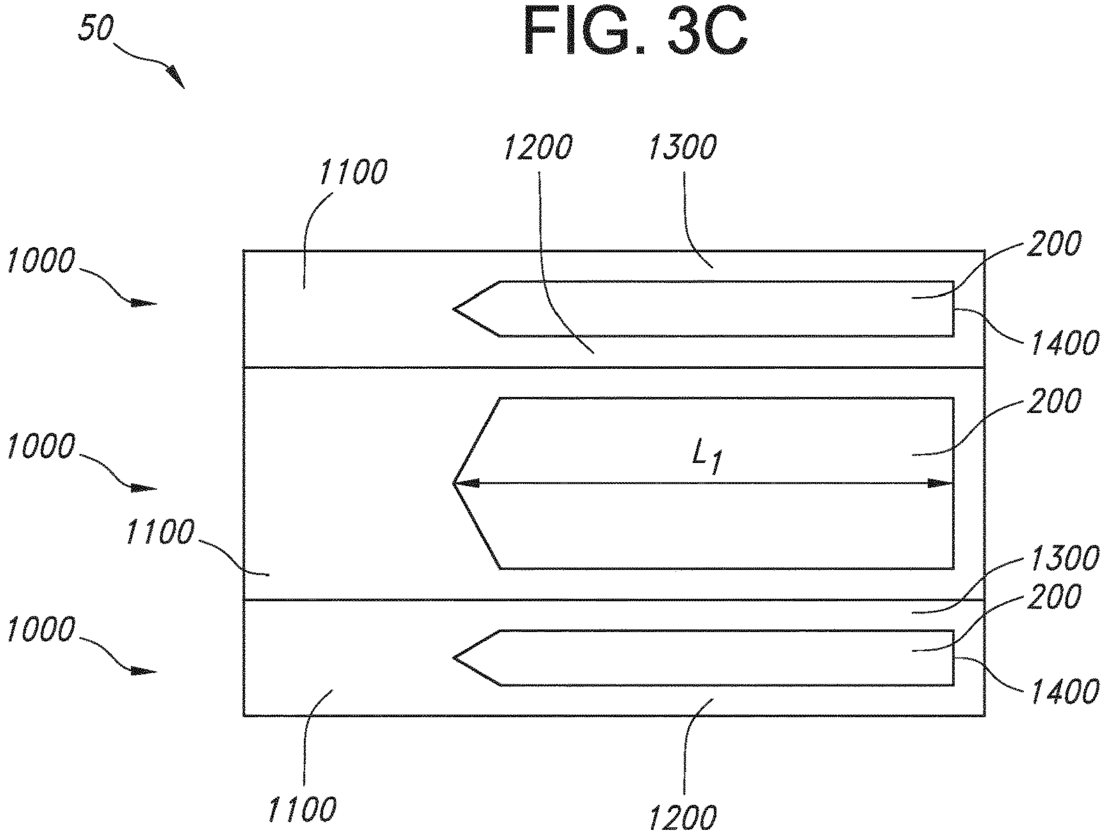

FIG. 3*d* schematically depicts an embodiment in a similar way as the embodiment schematically depicted in 3*a*. However, here the opening 200 has a V-cut. This may facilitate processing and/or convection.

Referring to e.g. FIGS. 1*a*-1*d*, 2*a*-2*d* and 3*d*, the vapor chamber (and thus essentially also the vapor chamber element) may have the shape of a central chamber (part) with two (chamber) branches, which may optionally be connected. When the branches are connected, the vapor chamber may have a cross-sectional shape of a hollow rectangle, wherein the hollow part may be elongated, and in embodiments may also be rectangular. When the branches are not connected at two sides, but only with the central chamber (part), the vapor chamber may e.g. have the shape of a (kind of) two teeth fork. Especially, the two branches are configured parallel. The length of the central part and the length of the branches may be in the order of 1:10-10:1, especially 1:10-2:5. However, other dimensions may also be possible.

In embodiments, the volumes of the central chamber part and the respective branches may also be about in the order of 1:10-10:1, especially 1:10-2:5. In general, the volume of the chamber (part) in the fourth part may be about the same as or smaller than of the central part, though other volume ratios may also be possible.

Further, as shown in e.g. FIGS. 1*a* and 3*d*, in embodiments the second part 1200 and the third part 1300 do not extend beyond the fourth part 1400. In this way, the chamber opening 200 may be as large as possible.

FIGS. 4*a*-4*e* schematically depict some embodiments of heat fin elements 2000.

Figure 4A:
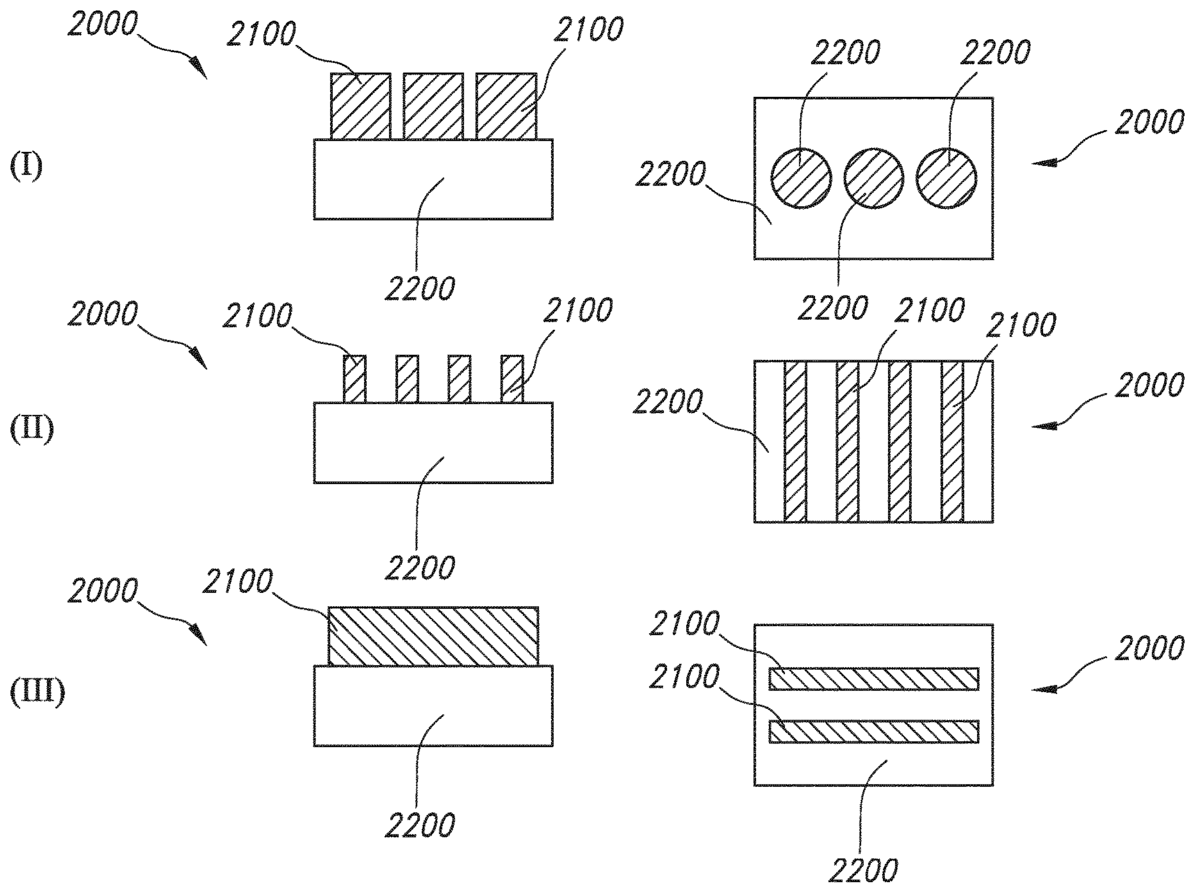
FIGS. 4*a*-4*e* schematically depict some further embodiments and variants.

FIG. 4*a* schematically depicts three embodiments of possible heat fin elements 2000. Embodiment I schematically depicts cylindrical heat fins 2100. Embodiment II schematically depicts small plate like heat fins 2100, perpendicularly arranged on the length of the supports 2200. Embodiment III schematically depicts plate like heat fins 2100, parallelly arranged on the length of the supports 2200. On the left, side views are schematically depicted; on the right, top views are schematically depicted.

Figure 4B:
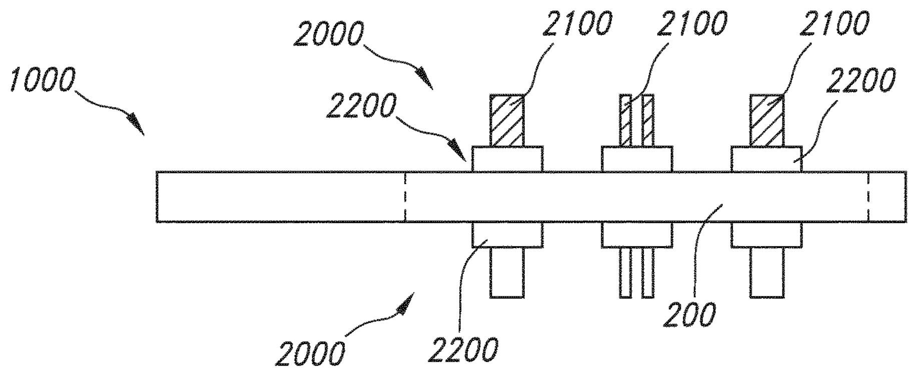

FIG. 4*b* schematically depicts a cross-sectional view or side view of an embodiments of the vapor chamber element 1000, by way of example with different types of heat fins 2100, at both sides of the opening 200.

Figure 4C:
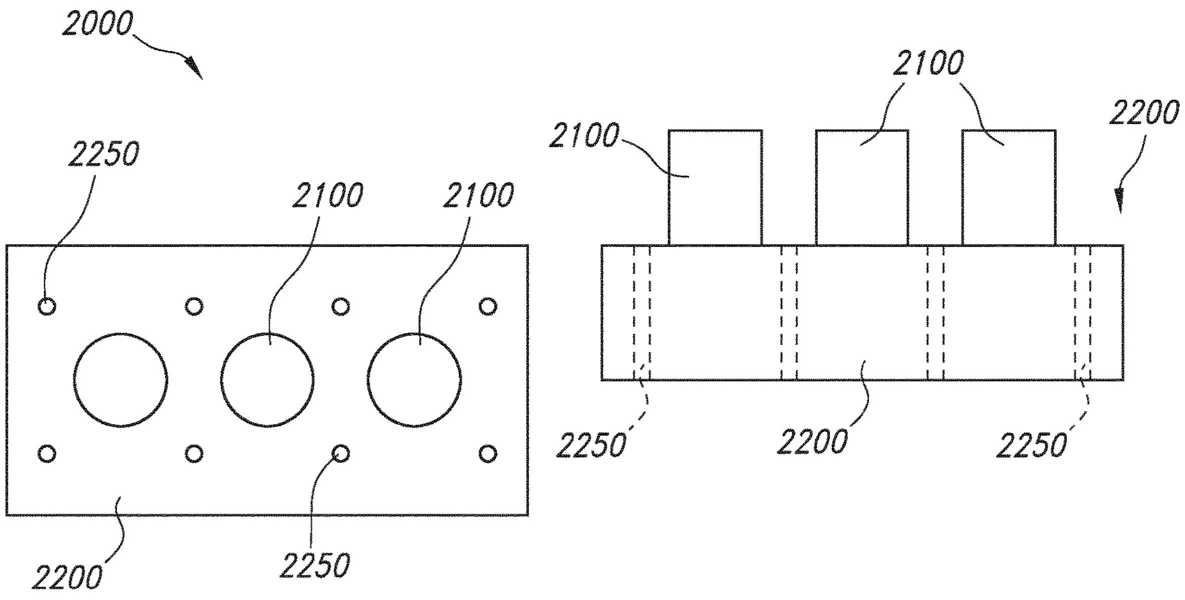

FIG. 4*c* schematically depict an embodiment wherein the one or more supports 2200 comprise one or more openings 2250. These openings 2250 can be configured in communication with the opening 200 (see e.g. FIG. 4*b*). Further, these openings 2250 may have an opening axis perpendicular to a cross-sectional plane of the opening 200 (see e.g. FIG. 4*b*).

Figure 4D:
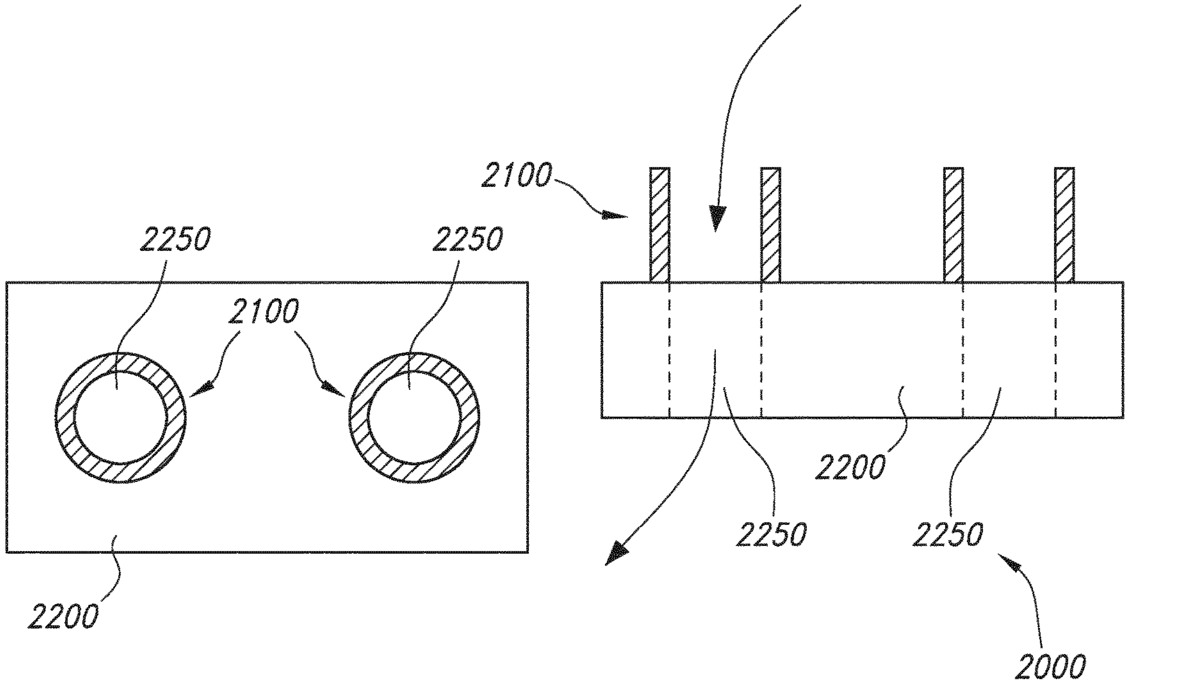
Figure 4E:
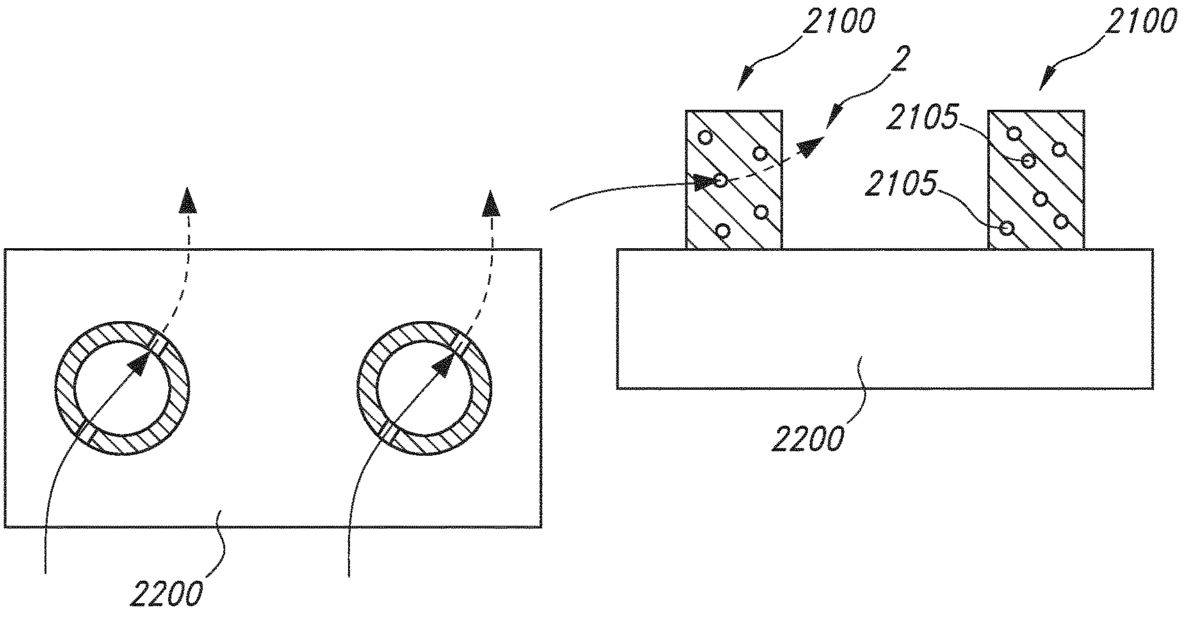

FIGS. 4*d* and 4*e* schematically depict embodiments wherein the one or more of the one or more heat fins 2100 are hollow (FIG. 4*d*) and/or perforated (FIG. 4*e*). The perforations of the heat fins 2100 are indicated with reference 2105. The arrows indicate possible air flows.

Of course, embodiments may be combined.

Figure 5A:
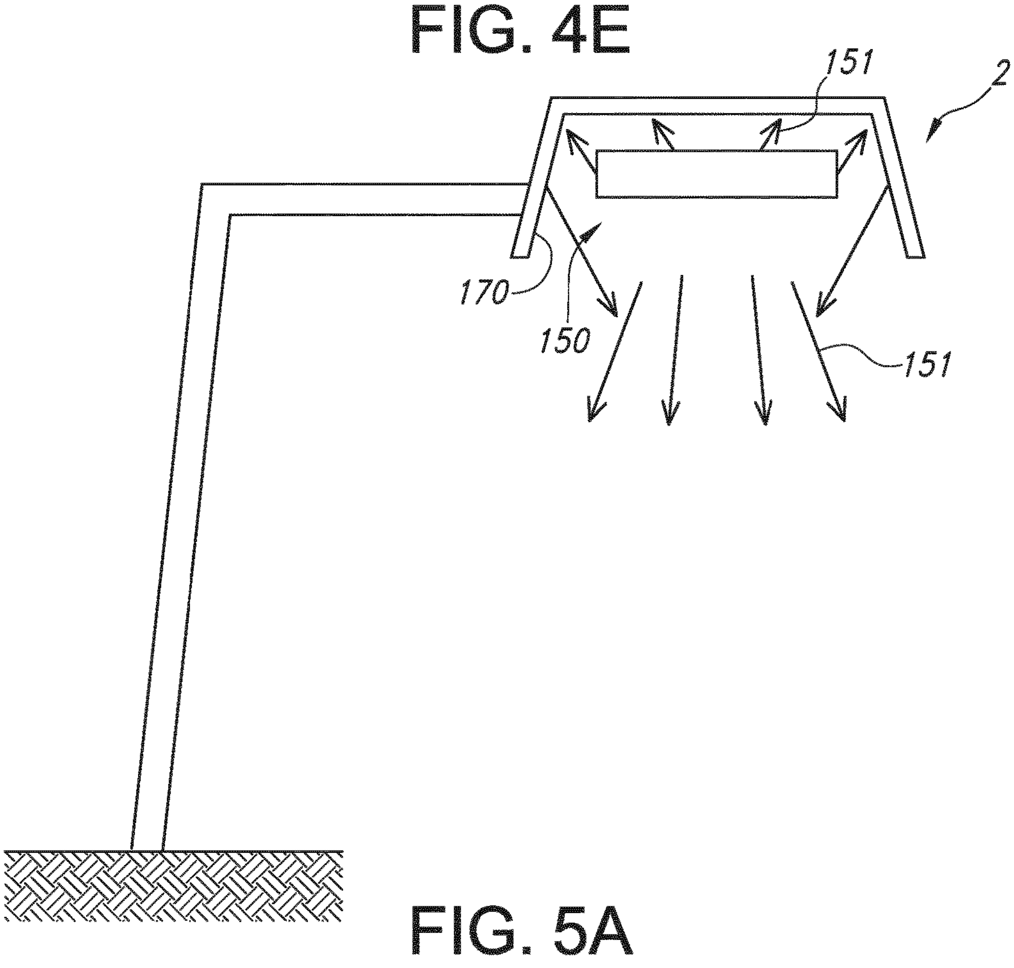
FIGS. 5*a*-5*b* schematically depict some further aspects. The schematic drawings are not necessarily to scale.

FIG. 5*a* schematically depicts an embodiment of a luminaire 2 comprising a reflector 160 and the lighting device 150. The reflector 170 partly circumferentially surrounds the lighting device 150. Especially, the reflector 170 is configured to redirect at least part of the device light 151. FIG. 5*a* schematically depicts a street lighting luminaire 2 Here, by way of example the street lighting luminaire 2 comprises a pole.

Figure 5B:
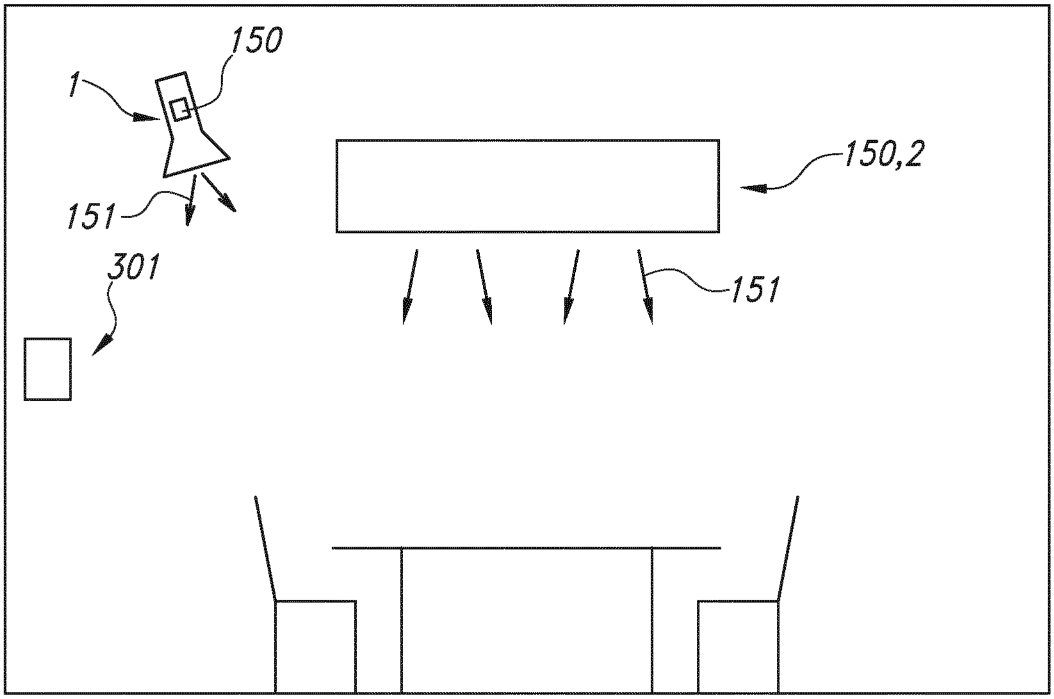

FIG. 5*b* schematically depicts an embodiment of a luminaire 2 comprising the light generating device 150 as described above. Reference 301 indicates a user interface which may be functionally coupled with the control system (not depicted) comprised by or functionally coupled to the luminaire 2. FIG. 3 also schematically depicts an embodiment of lamp 1 comprising the light generating device 15 as described herein.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising an electronic component and one or more vapor chamber elements, wherein the electronic component is thermally coupled to at least one of the one or more vapor chamber elements;

wherein the electronic component comprises a solid state light source; and wherein the vapor chamber element comprising a first part, a second part, and a third part, wherein the second part and third part are associated to the first part, wherein the second part and third part are configured spatially separated with a first distance (d1) along a first length (L1), defining an opening between the second part and the third part; wherein the vapor chamber element comprises one or more vapor chambers at least partially comprised by the second part and third part; wherein the vapor chamber element further comprises one or more heat fin elements, wherein the one or more heat fin elements comprise one or more heat fins, wherein the one or more heat fin elements bridge the first distance (d1) and close a part of the opening;

wherein the first part, the second part, and third part mutually share a single vapor chamber; and wherein the one or more heat fin elements comprise a support configured to support the one or more heat fins, wherein the support bridges the first distance (d1).

2. The lighting device according to claim 1, wherein the one or more heat fin elements close 5-60% of the opening.

3. The lighting device according to claim 1, wherein the second part has a second width (d2), wherein the third part has a third width (d3), wherein the second part, the opening, and the third part define a total width (w), wherein the second width (d2) and the third width (d3) together have a ratio to the total width (w) selected from the range of $0.15 \leq (d2+d3)/w \leq 0.4$.

4. The lighting device according to claim 3, wherein $0.25 \leq (d2+d3)/w \leq 0.3$.

5. The lighting device according to claim 1, wherein the second width (d2) and the third width (d3) each independently are at least 2 mm.

6. The lighting device according to claim 1, wherein the first length (L1) and the first distance (d1) have a ratio $2 \leq L1/d1 \leq 200$.

7. The lighting device according to claim 1, wherein the one or more supports comprise one or more openings.

8. The lighting device according to claim 1, wherein the one or more of the one or more heat fins are hollow and/or perforated.

9. The lighting device according to claim 1, wherein the lighting device comprising a plurality of vapor chamber elements.

10. The lighting device according to claim 9, wherein the plurality of vapor chamber elements have an n-gonal configuration, wherein n is selected from the group consisting of 2, 4, 6, 8, 10, and 12.

11. The lighting device according to claim 1, wherein the electronic component further comprises a driver for the solid state light source.

12. The lighting device according to claim 1, wherein the electronic component (160) is thermally coupled to at least one of the one or more first parts.

13. A lamp or a luminaire comprising the lighting device according to claim 1.

* * * * *